United States Patent Office.

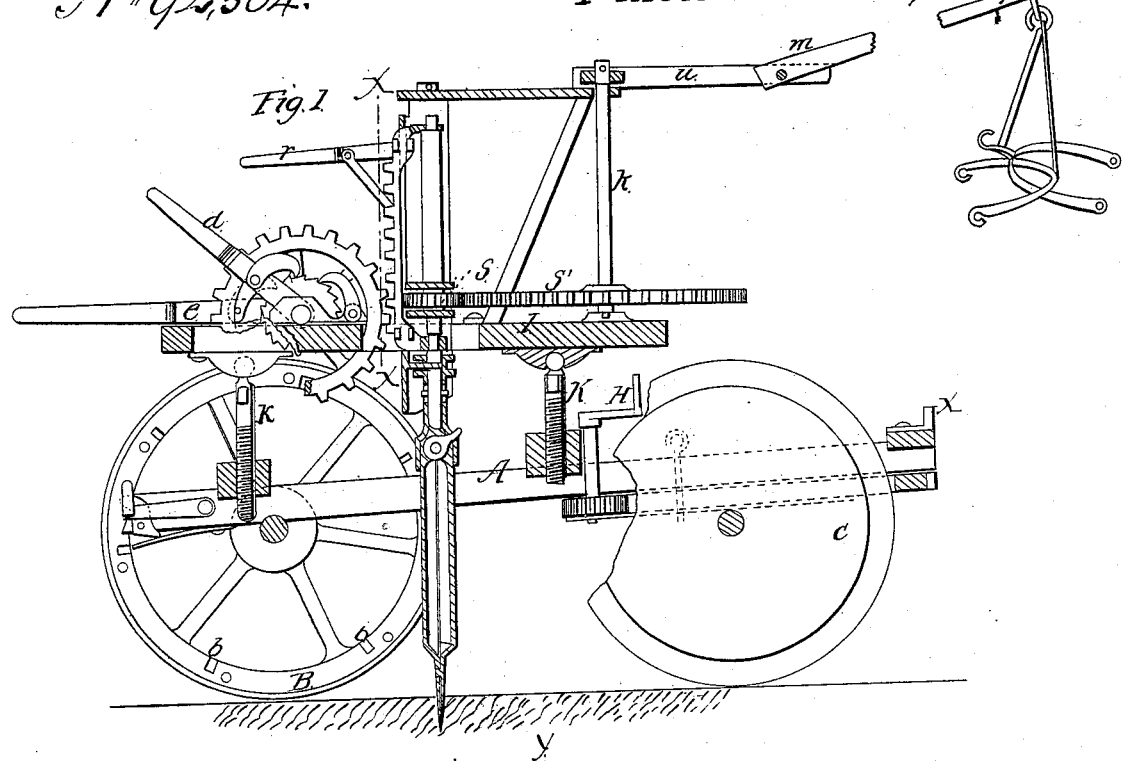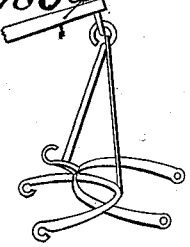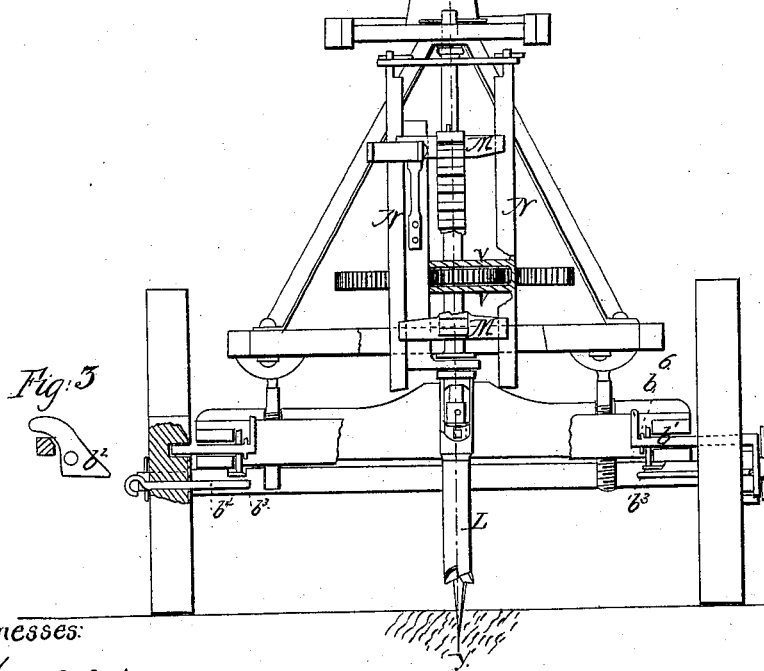

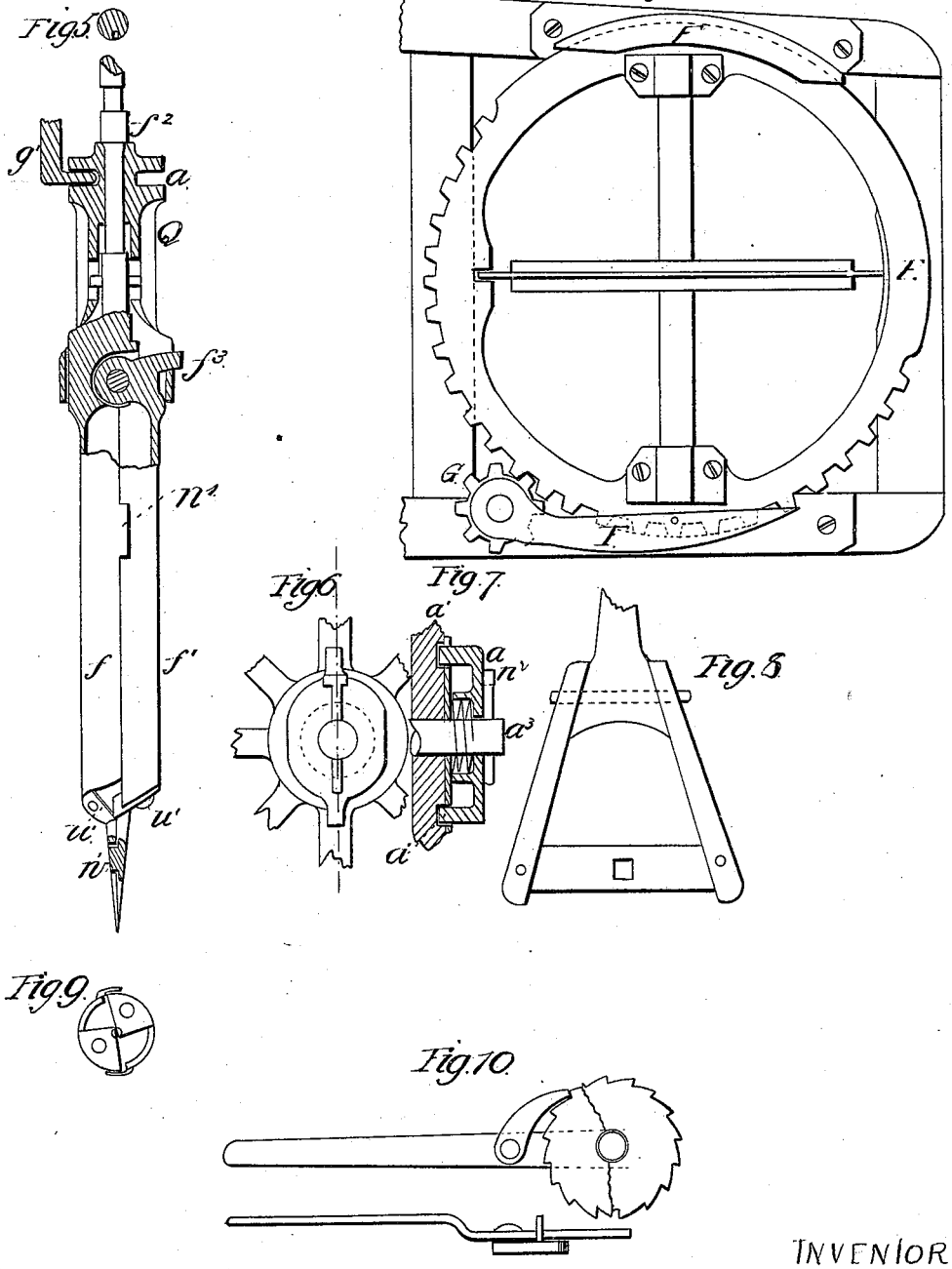

JAMES ARMSTRONG, OF BUCYRUS, OHIO.

*Letters Patent No. 92,504, dated July 13, 1869.*

IMPROVED POST-AUGER.

The Schedule referred to in these Letters Patent and making part of the same.

*To all whom it may concern:*

Be it known that I, JAMES ARMSTRONG, of Bucyrus, in the county of Crawford, and State of Ohio, have invented a new and improved Machine for Boring Post-Holes; and I do hereby declare that the following is a full, clear, and exact description thereof, which will enable those skilled in the art to make and use the same, reference being had to the accompanying drawings, forming part of this specification.

The nature of my invention relates to improvements in machines for boring fence-post holes, the object of which is to provide a machine that may be drawn over the ground, so arranged that the animal used for drawing it may also be used for communicating the rotary motion to the auger or boring-instruments.

It consists in an improved auger, mounted on a frame supported on wheels, and provided with a sweep, to which the horse may be hitched for drawing the machine over the ground, and for operating the auger when the machine has been secured in the proper position.

Also, in an improved construction of the hollow auger, whereby it may be opened, to discharge the dirt, and locked together for operation.

Also, in an arrangement of detachable bits for the auger.

Also, in the arrangement of mechanism for raising and lowering the auger.

Also, in the improved method of locking the wheels.

Also, in an improved construction of the guiding-wheel, and method of attaching it to the frame for guiding it.

Also, in the construction of the sweep, and the method of attaching it, whereby it admits of the animal drawing the machine or operating the auger.

Also, in a means of adjusting the table upon which the auger is supported, so as to maintain the auger in a vertical position.

In the drawings—

Figure 1 represents a longitudinal vertical section of my improved machine;

Figure 2 represents a rear view, with parts broken away;

Figure 3 represents a view of one of the spring-bolts and catches;

Figure 4 represents an under plan view of the guiding-wheel, and the manner of connecting it to the frame;

Figure 5 represents a view of the auger, partly in section;

Figure 6 represents two views of the method of clutching the wheel to the axle;

Figure 7 represents a detached view of a portion of the sweep;

Figure 8 represents an end view of the auger; and

Figure 9 represents the ratchets and pawls, for elevating and depressing the auger.

Similar letters of reference indicate corresponding parts.

A represents a frame, supported on the axle of the wheels B, and at the front end on the guiding-wheel C, which is suspended centrally upon the axle D, the ends of which are borne in journal-boxes in the rim of the horizontal wheel E, on which the frame A rests, and to which it is connected by the curved caps F, in which the said wheel E oscillates, being actuated by the toothed pinion G and hand-crank H, whereby the direction of the machine is governed.

One of the hind wheels is rigidly connected to the axle, and the other is arranged to run loosely, or be rigidly connected thereto by a spring-clutch, $a$, which is secured to the axle, and provided with spurs $a^1$, which take into corresponding recesses in the hub of the wheel, when the clutch is pressed inward against the spring $a^3$, and held there by the pin $a^2$.

When it is desired to permit the wheel to run loose on the axle, the pin is withdrawn and inserted in a hole nearer the end of the axle, whereby the spring $a^3$ will prevent the lugs of the clutch from coming in contact with the hub.

In order that the posts may be set at regular distances apart, the wheels are provided, in their rims, with the recesses $b$, wherein spring-bolts may be arranged to catch and stop the machine at the proper time.

The said spring-bolts are provided with spring-catches, which are maintained in notches in the bolts by the springs $b^3$, whereby the bolts are prevented from contact with the wheels until pins $b^4$, arranged at distances in the rim of the wheels corresponding with the required distance for the post-holes, are brought, by the movement of the wheels, into contact with the spring-catches, lifting them out of the notches in the said bolts, when they will be forced into the notches $b$ of the wheels, by their springs $b^6$, thereby stopping the machine.

I represents a table, supported on the frame A by the adjusting-screws K, whereby it may be adjusted to a horizontal position whenever it may be required by reason of uneven surface of the ground whereon the machine stands when a hole is to be bored.

L represents an auger, supported upon slides M, arranged to work in the vertical guides N, and provided with the rack O and wheel P, for moving it up or down.

The wheel P is supported on a horizontal shaft, arranged in suitable bearings, and provided with two ratchets, pawls, and levers, $d$ and $e$, one for raising it up and the other for forcing it down.

The body of the said auger is composed of two semicircular grooved parts, $f$ and $f^1$, the part $f$ being connected rigidly to the stem or shank $f^2$, and the part $f^1$ being hinged thereto, and provided with a lug, $f^3$, projecting through a slot in the sliding and rotating-sleeve Q, which is provided, at its upper end, with the annular groove $q$, into which the crotched right-angled end of the slide $q'$ takes, which slide is supported on the slides M, to which the shank $f^2$ of the auger is secured, and is provided with the hand-lever $r$ for working it.

$s$ represents a pinion, connected to the shank $f^2$ of the auger by a spline, working in a groove in the said shank, and arranged between the two cross-pieces $v\ v$, whereby it is maintained in gear with the driving-wheel $s'$ on the vertical shaft $t$, to which motion is communicated by the sweep $u$, which is made in two parts, and jointed at $w$, for the purpose of accommodating the outer end to the height of the horse, however uneven the ground may be.

The two parts of the auger are provided with recesses and projections $w$, whereby, when they are in condition for boring, they are locked together.

The bits $u'$ may be connected to the body of the auger, in a manner to be adjusted thereon as they wear, and to be readily detached when desired.

When the machine has been moved along to the proper position, the horse may be directed to work in a circular track around the machine, communicating motion to the driving-wheel S', and from that to the auger, through the pinion S.

The operator then, by the hand-lever $e$, will force the auger into the ground until the desired depth has been attained, after which, by disconnecting the pawl of the hand-lever $e$, and connecting that of the lever $d$, he will raise the auger out of the ground, and, by means of the hand-lever $r$, will work the sleeve Q quickly up and down, thereby shaking out the dirt from the two parts of the auger.

Then, by directing the horse in the proper direction to advance the machine another stage, and connecting the yoke, by which he is hitched to the sweep, to the pin $x$ by a chain, and withdrawing the spring-bolts $b^1$ from the notches $b$ in the wheels, the machine may be moved forward to take up the next position for the next hole, at which point the machine will be stopped by the spring-bolts flying into the said notches $b$ on being released from their catches $b^6$ by the pins $b^4$.

The horse is then disconnected from the pin $x$, and set into a circular motion again, and the operation of boring proceeded with as before.

The method of guiding the machine will be readily understood without further description.

I claim as new, and desire to secure by Letters Patent—

1. The machine for boring post-holes, provided with the mechanism for transporting it over the ground, and the mechanism for giving it rotary motion, all arranged as described, for the purpose specified.

2. The post-hole auger, constructed of the parts $f$ and $f'$, and hinged together substantially as and for the purpose described.

3. The combination, with the auger constructed as described, of the sleeve Q, handle $r$, and slide $q'$, for operating the slide, substantially as and for the purpose described.

4. In combination with the auger, constructed as described, the ratchets and pawls $d\ e$, rack O, toothed wheel P, sleeve Q, angular slide $q'$, and hand-lever $r$, all arranged and operating as described for the purpose specified.

5. The combination, with the wheels B of the spring-bolts $b^1$, spring-catches $b^2$, and pins $b^4$, substantially as and for the purpose described.

6. The guiding-wheel C, constructed as described, in combination with the toothed wheel E and frame A, substantially as and for the purpose described.

7. The sweep $u$, provided with the joint $w$, with means for connecting the horse to the frame for drawing the machine over the ground, substantially as and for the purpose described.

8. The table I, provided with means, as described, for connecting it to frame A, and for adjusting it so as to present the auger in a vertical position, substantially as and for the purpose described.

JAMES ARMSTRONG.

Witnesses:
  D. F. WELSH,
  G. S. SEELSBY.